Patented Jan. 4, 1938

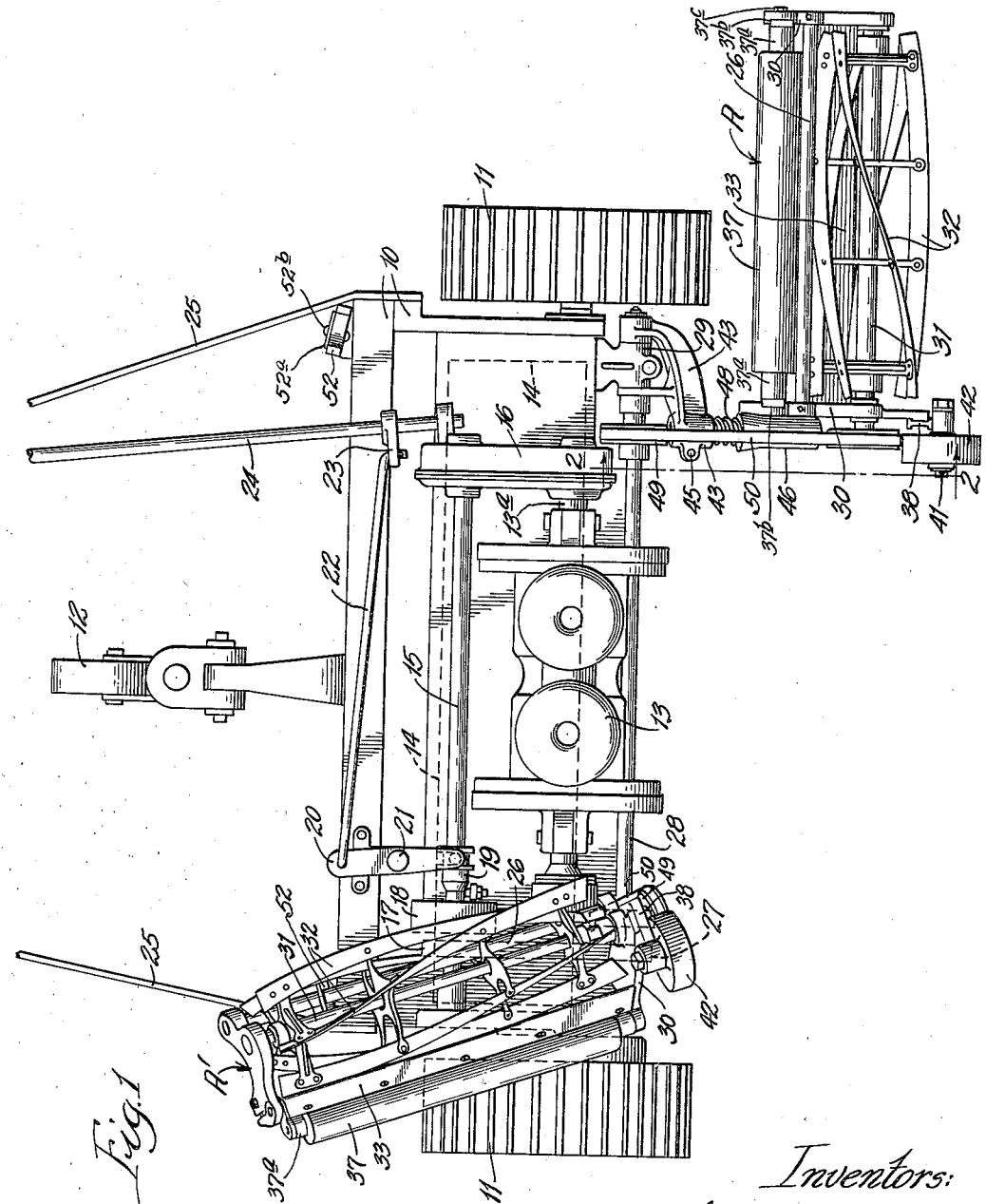

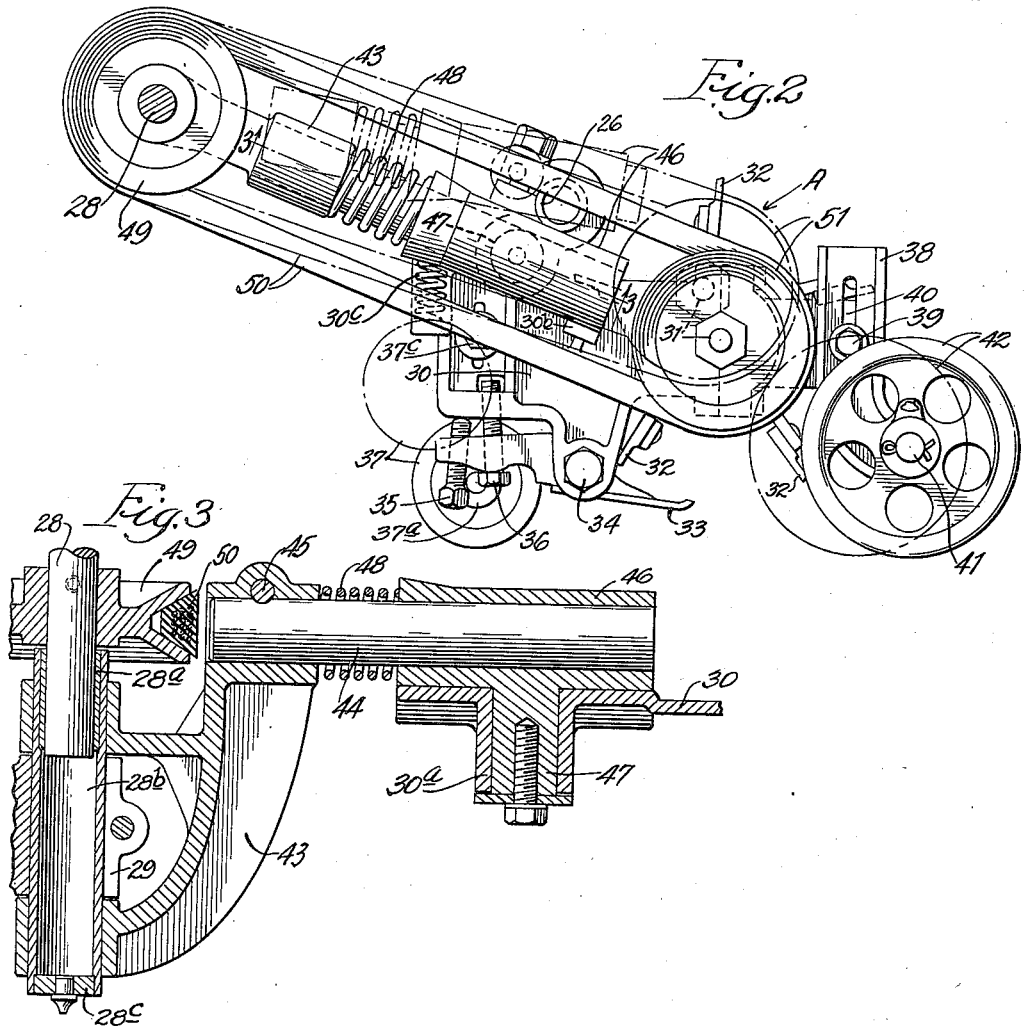

2,104,719

UNITED STATES PATENT OFFICE 2,104,719

POWER LAWN MOWER WITH SIDE CUTTER UNITS

John B. Pol, La Porte, Ind., and William F. Krenzke, Racine, Wis., assignors to Jacobsen Manufacturing Company, Racine, Wis., a corporation of Wisconsin Application March 12, 1936, Serial No. 68,364

28 Claims. (Cl. 56—7)

The object of this invention is to provide in a power lawn mower an improved form of side cutter unit, particularly one which is pushed in advance of the main cutter unit.

Another object is to provide such a side cutter unit which is so mounted on the main frame so as to permit its being swung up and over the main frame when the side unit is not in use.

Another object is to provide a flexible and yieldable connection between the side unit and the main frame to permit the side unit to follow the undulations of ground over which the mower travels, and to prevent breakage should the side unit strike an obstacle which it cannot pass over.

Another object is to provide a drive for the side cutter which is rendered inoperative when the side unit strikes an obstruction.

These and other objects, as will hereinafter appear, are accomplished by this invention which is fully described in the following specification and shown in the accompanying drawings, in which—

Figure 1 is a top plan view of the mower with two side cutter units, one of which is lowered into cutting position while the other is raised to an inoperative or transporting position;

Fig. 2 is an enlarged end elevation on the line 2—2 of the right-hand cutter unit; and Fig. 3 is a partial enlarged section on the line 3—3 of Fig. 2.

The embodiment illustrated comprises a power mower having a main frame 10 supported on traction wheels 11 and a rear caster wheel 12, and having an internal combustion engine 13 for driving the tractor wheels. A main cutting reel 14 is driven by the engine in a well known manner in conjunction with the traction wheels, or either may be driven by the engine alone. The engine has a shaft 13a which drives a shaft 15 through a gear train (not shown) but which is contained within the housing 16. The shaft 15 may be operably connected to or disconnected from a sprocket 17 by means of a clutch 18 which is operated by means of a member 19 which is moved back and forth by a lever 20 pivotally mounted at 21. A link 22 connects the outer end of the lever 20 to a lever 23 on a reel clutch operating rod 24 on the main mower which terminates in a handle (not shown) at the rear of the machine where it is under the control of an operator. The rear end of the rod 24 is supported on suitable guide rods 25 by means of which the mower may be guided and turned.

The sprocket 17 through a chain 26 or the like drives a sprocket 27 on a shaft 28 which is suitably journaled in bearings on the main frame, as will later be described. This shaft serves to drive the side cutter units at the two forward corners of the main frame. Thus the unit A at the right-hand side is shown in the lowered position for cutting, while the unit A' at the left is shown in the raised position for transporting. These units and their drives are alike except for the fact they are made rights and lefts so that a description of one serves for both. Each side cutter unit has a frame 30 in which is journaled a side cutter shaft 31 which carries the usual cutter reel 32 which operates in conjunction with a stationary knife 33 which is mounted on a pivot 34 at each end and made adjustable toward and from the reel by means of adjusting screws 35, 36.

A ground engaging roller 37 is journaled in brackets 37a, one at each end, and these are adjustably mounted in grooves 37b in the side cutter frame 30 and secured by screws 37c (see Fig. 2). The roller rolls over the lawn which has just been cut by the reel 32. At the forward and preferably the inner corner of the side unit frame is mounted a member 38 which is adjustably secured thereto by means of a screw 39 which operates in a vertical slot 40. The member 38 carries a laterally extending stud 41 on which is journaled a ground engaging wheel 42. If desired, a wheel like 42 may be similarly mounted at the outer front corner of the side frame. Thus the ground engaging roller 37 and the wheel 42 together fix the depth of the cut which may be varied by adjusting the members 37a and 38 with respect to the frame 30.

Each end of the shaft 28 is journaled in a bearing 28a in the inner end of a sleeve 28b, the outer end of which is closed by a cap 28c and which is firmly held by a member 29 secured to the main frame. A bracket 43 is bifurcated and is journaled upon the ends of each sleeve 28b, and has bearings lying one on each side of the member 29. This bracket carries a fulcrum rod 44 which is secured thereto by means of a screw 45 or the like. A connecting member 46 is slidably and rotatably mounted upon the rod 44 and has a laterally extending cylindrical boss or stub axle 47 upon which is journaled a suitable bearing 30a on the side cutter frame 30, as shown in Fig. 3.

A compression spring 48 surrounds the rod 44 and extends between the bracket 43 and connecting member 46. This connecting member normally engages a stop 30b on the frame 30, the opposite end of the connecting member being pressed upwardly by means of a compression spring 30ᶜ which extends between a lug on the frame 30 and the underside of the member 46. A sheave 49 is pinned on the shaft 28 preferably substantially in line with the center of the rod 44, as shown in Fig. 3. A V-belt 50 passes around the sheave 49 and around a similar sheave 51 on the shaft 31. Tension is normally maintained on the belt 50 by means of the spring 48 which is preferably in the vertical plane of the rod 44.

Thus it will be seen that if the wheel 42 strikes an obstruction it may be moved from the full line position of Fig. 2 to the dotted line position, the side cutter frame being rocked about the stub axle 47, compressing the spring 30ᶜ. The roller 37 will then be raised from the full line position to the dotted line position and other parts of the side cutter unit will be shifted correspondingly. At the same time the spring 48 will be compressed, as shown in dotted lines, thereby removing the tension from the V-belt 50 so that this side cutter will no longer be driven but will stop even though the shaft 28 continues to revolve. Thus damage to the side cutter unit is prevented and, owing to the universal action of the flexible connection, the side cutter unit readily follows the contour of the ground over which it passes.

When it is desired to dispense with the use of the side cutters, the clutch 18 is thrown out and one of the side cutter frames at a time is lifted and swung about the shaft 28 as an axis, and also about the fulcrum rod 44 until the side unit assumes the position A' of Fig. 1. The flexible V-belt permits of this bending, particularly when lying above and below the fulcrum rod 44. The side cutter frame is then partially carried upon a U-shaped stirrup 52 which engages a tube 26 of the side cutter unit frame. In this position the side cutter unit lies entirely within the path of the traction wheels so that the mower will pass through a gateway of minimum width. If desired, a lock or hook 52ᵃ pivotally mounted on a rivet 52ᵇ may be provided for securing the tube 26 of the side until in the stirrup.

While we have shown and described but a single embodiment of our invention, it is to be understood that it is capable of many modifications. Changes, therefore, in the construction and arrangement may be made which do not depart from the spirit and scope of the invention as disclosed in the appended claims.

We claim:

1. In a power-driven lawn mower, a main frame, an engine thereon, a main cutter rotatably carried thereby, a side cutter unit pivotally carried by the main frame, and means for selectively driving the side cutter from the engine while the mower is in motion.

2. In a power-driven lawn mower, a main frame, an engine thereon, a main cutter rotatably carried thereby, a side cutter unit pivotally carried by the main frame, means for selectively driving the side cutter from the engine while the mower is in motion, the side cutter unit being mounted to swing about axes both longitudinal and transverse to the direction of motion of the mower so as to swing from an operative position parallel to the main cutter to an inoperative position above the main cutter, and a support for the unit in the raised position.

3. In a power-driven lawn mower, a main frame, an engine thereon, a main cutter rotatably carried thereby, a side cutter unit pivotally carried by the main frame, and means, including a V-belt, for selectively driving the side cutter from the engine while the mower is in motion.

4. In a power-driven lawn mower, a main frame, an engine thereon, a main cutter rotatably carried thereby, a side cutter unit pivotally carried by the main frame, means including a V-belt, for selectively driving the side cutter from the engine while the mower is in motion, the side cutter unit being mounted to swing about axes both longitudinal and transverse to the direction of motion of the mower so as to swing from an operative position parallel to the main cutter to an inoperative position above the main cutter, and a support for the unit in the raised position.

5. In a power-driven lawn mower, a main frame, an engine thereon, a main cutter rotatably carried thereby, a shaft driven by the engine and lying transversely to the direction of motion of the mower, a bracket journaled about the axis of the shaft, a side cutter unit pivotally carried by the bracket, and means for driving the side cutter from the shaft.

6. In a power-driven lawn mower, a main frame, an engine thereon, a main cutter rotatably carried thereby, a shaft driven by the engine and lying transversely to the direction of motion of the mower, a bracket journaled about the axis of the shaft, a side cutter unit pivotally carried by the bracket, and means, including a V-belt, for driving the side cutter from the shaft.

7. In a power-driven lawn mower, a main frame, an engine and a main cutter carried thereby, a shaft driven by the engine and lying transversely to the direction of motion of the mower, a bracket journaled about the axis of the shaft, a side cutter unit, a side cutter journaled therein, a thrust member carried by the bracket and pivotally connected to the side cutter unit, and means including a flexible V-belt for driving the side cutter from the shaft.

8. In a power-driven lawn mower, a main frame, an engine and a main cutter carried thereby, a shaft driven by the engine and lying transversely to the direction of motion of the mower, a bracket journaled on the shaft, a side cutter unit having a side cutter journaled therein, a thrust member carried by the bracket and pivotally connected to the side cutter unit whereby this unit is pushed in advance of the main frame, and means for driving the side cutter from the shaft including a flexible V-belt, one strand of which lies above and the other below the thrust member.

9. In a power-driven lawn mower, a main frame, an engine and a main cutter carried thereby, a shaft driven by the engine and lying transversely to the direction of motion of the mower, a bracket journaled on the shaft, a side cutter unit having a side cutter journaled therein, a thrust member carried by the bracket and pivotally and yieldably connected to the side cutter unit whereby this unit is pushed in advance of the main frame, and means for driving the side cutter from the shaft including a flexible V-belt, one strand of which lies above and the other below the thrust member.

10. In a power-driven lawn mower, a main frame, an engine and a main cutter carried thereby, a shaft driven by the engine and lying transversely to the direction of motion of the mower, a bracket journaled on the shaft, a side cutter unit having a side cutter journaled therein, a thrust rod carried by the bracket, the side unit being pivotally and yieldably mounted on the thrust rod, and means for driving the side cutter from the shaft.

11. In a power-driven lawn mower, a main frame, an engine and a main cutter carried thereby, a shaft driven by the engine and lying transversely to the direction of motion of the mower, a bracket journaled on the shaft, a side cutter unit having a side cutter journaled therein, a thrust rod carried by the bracket, the side unit being pivotally and yieldably mounted near one end on the thrust rod, and means for driving the side cutter from the shaft, including a V-belt, one strand of which lies above and the other below the thrust member.

12. In a power-driven lawn mower, a main frame, an engine and a main cutter carried thereby, a shaft driven by the engine and lying transversely to the direction of motion of the mower, a bracket journaled on the shaft, a side cutter unit having a side cutter journaled therein, a thrust rod carried by the bracket, the side unit being pivotally and yieldably mounted near one end on the thrust rod, means for driving the side cutter from the shaft, including a flexible V-belt, one strand of which lies above and the other below the thrust member, the axis of the rod being in the plane of the V-belt when the latter is in the driving position whereby the unit may be raised and turned to a position above the main cutter, a stirrup for holding the unit in the latter position, and means for locking the unit in the stirrup.

13. In a power-driven lawn mower, a main frame, an engine and a main cutter carried thereby, a side cutter frame, a side cutter rotatably mounted in the side frame, means for longitudinally pivotally connecting the side frame to the main frame so as to be pushed thereby, a roller on the side frame at the rear of the side cutter, a wheel at a forward corner of the side frame adjustably mounted thereon for varying the height of cut of the side unit, and means for driving the side cutter from the engine.

14. In a power-driven lawn mower, a main frame, an engine and a main cutter carried thereby, a side cutter frame, a side cutter rotatably mounted in the side frame, means for longitudinally pivotally connecting the side frame to the main frame, a roller on the side frame at the rear of the side cutter, a wheel at a forward corner of the side frame adjustably mounted thereon for varying the height of cut of the side unit, and means for driving the side cutter from the engine.

15. In a power-driven lawn mower, a main frame, an engine and a main cutter carried thereby, a side cutter frame, a side cutter rotatably mounted in the side frame, means for longitudinally pivotally connecting the side frame to the main frame a roller on the side frame at the rear of the side cutter, a wheel at a forward corner of the side frame adjustably mounted thereon for varying the height of cut of the side unit, and means for driving the side cutter from the engine, including a flexible V-belt, one strand of which lies on each side of the longitudinal pivot.

16. In a power-driven lawn mower, a main frame, an engine thereon, a transverse shaft driven by the engine and journaled on the main frame, a bracket mounted to swing about the shaft, a rod extending forwardly from the bracket, a side cutter unit having a frame hingedly mounted on the forward end of the rod, and means for driving the side cutter from the shaft.

17. In a power-driven lawn mower, a main frame, an engine thereon, a transverse shaft driven by the engine and journaled on the main frame, a bracket mounted to swing about the shaft, a rod extending forwardly from the bracket, a side cutter unit having a frame hingedly mounted on the forward end of the rod, and means for driving the side cutter from the shaft, the side frame mounting being jointed and bendable about a transverse axis so as to yield when the side unit strikes an obstruction.

18. In a power-driven lawn mower, a main frame, an engine thereon, a transverse shaft driven by the engine and journaled on the main frame, a bracket mounted to swing about the shaft, a rod extending longitudinally from the bracket, a member slidably and rotatably mounted on the rod and having a laterally extending axle, a side cutter unit having a frame hingedly mounted on the axle, and means for driving the side cutter from the shaft.

19. In a power-driven lawn mower, a main frame, an engine thereon, a transverse shaft driven by the engine and journaled on the main frame, a bracket mounted to swing about the shaft, a rod extending longitudinally from the bracket, a member slidably and rotatably mounted on the rod and having a laterally extending axle, a side cutter unit having a frame hingedly mounted on the axle, means for driving the side cutter from the shaft including a V-belt, and a spring urging the member outwardly for maintaining tension in the V-belt.

20. In a power-driven lawn mower, a main frame, a rotary cutter rotatably mounted therein, traction wheels rotatably mounted thereon, one at each side of the main frame, an engine on the main frame, means for driving the wheels from the engine, a transverse shaft journaled on the frame and driven from the engine, a bracket pivotally mounted to oscillate about the axis of the shaft, a rod extending longitudinally from the bracket, a side cutter unit having a rotary cutter rotatably mounted therein, ground-engaging wheels on the unit, said unit being pivotally mounted on the rod so as to be moved thereby when the ground-engaging wheels are in contact with the ground, the unit being movable about the shaft and rod to a position above the traction wheels but inside the outer limits of the same, and means for driving the rotary cutter from the transverse shaft.

21. In a power-driven lawn mower, a main frame, a rotary cutter rotatably mounted therein, traction wheels rotatably mounted thereon, one at each side of the main frame, an engine on the main frame, means for driving the wheels from the engine, a transverse shaft journaled on the frame and driven from the engine, a bracket pivotally mounted to oscillate about the axis of the shaft, a rod extending longitudinally from the bracket, a side cutter unit having a rotary cutter rotatably mounted therein, ground-engaging wheels on the unit, said unit being pivotally mounted on the rod so as to be pushed thereby when the ground-engaging wheels are in contact with the ground, the unit being movable about the shaft and rod to a position above the traction wheels but inside the outer limits of the same, and means for driving the rotary cutter from the transverse shaft.

22. In a power driven lawn mower, a main frame, a rotary cutter rotatably mounted therein, traction wheels rotatably mounted thereon, one at each side of the main frame, an engine on the main frame, means for driving the wheels from the engine, a transverse shaft journaled on the frame and driven from the engine, a bracket pivotally mounted to oscillate about the axis of the shaft, a rod extending longitudinally from the bracket, a side cutter unit having a rotary cutter rotatably mounted therein, ground-engaging wheels on the unit, said unit being pivotally mounted on the rod so as to be moved thereby when the ground-engaging wheels are in contact with the ground, the unit being movable about the shaft and rod to a position above the traction wheels but inside the outer limits of the same, and means including a flexible V-belt for driving the rotary cutter from the transverse shaft.

23. In a power driven lawn mower, a main frame, a rotary cutter rotatably mounted therein, traction wheels rotatably mounted thereon, one at each side of the main frame, an engine on the main frame, means for driving the wheels from the engine, a transverse shaft journaled on the frame and driven from the engine, a bracket pivotally mounted to oscillate about a transverse axis, a rod extending longitudinally from the bracket, a side cutter unit having a rotary cutter rotatably mounted therein, ground-engaging wheels on the unit, said unit being pivotally mounted on the rod so as to be moved thereby when the ground-engaging wheels are in contact with the ground, the unit being movable about the shaft and rod to a position above the main frame, and means including a flexible V-belt for driving the rotary cutter from the transverse shaft.

24. In a power driven lawn mower, a main frame, a rotary cutter rotatably mounted therein, traction wheels rotatably mounted thereon, one at each side of the main frame, an engine on the main frame, means for driving the wheels from the engine, a transverse shaft journaled on the frame and driven from the engine, a bracket pivotally mounted to oscillate about a transverse axis, a rod extending longitudinally from the bracket, a side cutter unit having a rotary cutter rotatably mounted therein, ground-engaging wheels on the unit, said unit being pivotally mounted on the rod so as to be moved thereby when the ground-engaging wheels are in contact with the ground, the unit being movable about the shaft and rod to a position above the main frame, means including a flexible V-belt for driving the rotary cutter from the transverse shaft, and a spring on the rod for maintaining tension on the V-belt.

25. In a power driven lawn mower, a main frame, an engine thereon, a transverse shaft driven by the engine and journaled on the main frame, a bracket mounted to swing about a transverse axis, a rod extending longitudinally from the bracket, a member slidably and rotatably mounted on the rod and having a laterally extending axle, a side cutter unit having a frame hingedly mounted on the axle, and means for driving the side cutter from the shaft.

26. In a power driven lawn mower, a main frame, an engine thereon, a transverse shaft driven by the engine and journaled on the main frame, a bracket mounted to swing about a transverse axis, a rod extending longitudinally from the bracket, a member slidably and rotatably mounted on the rod and having a laterally extending axle, a side cutter unit having a frame hingedly mounted on the axle, means for driving the side cutter from the shaft including a V-belt, and a spring urging the member outwardly for maintaining tension in the V-belt.

27. In a power driven lawn mower, a main frame, a rotary cutter rotatably mounted therein, traction members rotatably mounted thereon, an engine on the main frame, means for driving the traction members from the engine, a transverse shaft journaled on the frame and driven from the engine, a bracket pivotally mounted to oscillate about a transverse axis, a rod extending longitudinally from the bracket, a side cutter unit having a rotary cutter rotatably mounted therein, ground-engaging means on the unit, said unit being pivotally mounted on the rod so as to be moved thereby when the ground-engaging means is in contact with the ground, the unit being movable about the shaft and rod to a position above the main frame, and means including a flexible V-belt for driving the rotary cutter from the transverse shaft.

28. In a power driven lawn mower, a main frame, a rotary cutter rotatably mounted therein, traction members rotatably mounted thereon, an engine on the main frame, means for driving the wheels from the engine, a transverse shaft journaled on the frame and driven from the engine, a bracket pivotally mounted to oscillate about a transverse axis, a rod extending longitudinally from the bracket, a side cutter unit having a rotary cutter rotatably mounted therein, ground-engaging means on the unit, said unit being pivotally mounted on the rod so as to be moved thereby when the ground-engaging means is in contact with the ground, the unit being movable about the shaft and rod to a position above the main frame, means including a flexible V-belt for driving the rotary cutter from the transverse shaft, and a spring on the rod for maintaining tension on the V-belt.

JOHN B. POL.
WILLIAM F. KRENZKE.